United States Patent
Hua et al.

(10) Patent No.: US 10,992,381 B2
(45) Date of Patent: Apr. 27, 2021

(54) METHOD FOR TRANSMITTING INFORMATION AND DEVICE FOR CARRYING OUT THE METHOD

(71) Applicant: SEW-EURODRIVE GMBH & CO. KG, Bruchsal (DE)

(72) Inventors: Zhidong Hua, Karlsruhe (DE); Christoph Steffen Keppler, Karlsruhe (DE); Henning Schäfer, Ubstadt-Weiher (DE); Andreas Wanjek, Waghäusel (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 607 days.

(21) Appl. No.: 14/916,319

(22) PCT Filed: Sep. 1, 2014

(86) PCT No.: PCT/EP2014/002361
§ 371 (c)(1),
(2) Date: Mar. 3, 2016

(87) PCT Pub. No.: WO2015/032479
PCT Pub. Date: Mar. 12, 2015

(65) Prior Publication Data
US 2016/0226586 A1     Aug. 4, 2016

(30) Foreign Application Priority Data
Sep. 3, 2013 (DE) .................. 10 2013 014 536.8

(51) Int. Cl.
*H04B 10/116* (2013.01)
*H04B 10/114* (2013.01)

(52) U.S. Cl.
CPC ....... *H04B 10/116* (2013.01); *H04B 10/1141* (2013.01)

(58) Field of Classification Search
None
See application file for complete search history.

(56) References Cited

U.S. PATENT DOCUMENTS 4,694,504 A * 9/1987 Porter ................... H04L 7/033
                                                                           327/172
7,415,212 B2   8/2008   Matsushita et al.
(Continued)

FOREIGN PATENT DOCUMENTS

| EP | 1 439 649 | 7/2004 |
|---|---|---|
| WO | 2007/046600 | 10/2006 |

(Continued)

OTHER PUBLICATIONS

OpenCV, detect blinking lights,, Jan. 16, 2012, http://stackoverflow.com/questions/8877228/opencv-detect-blinking-lights.*
(Continued)

*Primary Examiner* — Jai M Lee
(74) *Attorney, Agent, or Firm* — Carter DeLuca & Farrell LLP

(57) ABSTRACT

A method is provided for transmitting information and a device for carrying out the method, in which images are photographed by a camera with an image-taking rate, thus, especially frame rate, a controllable illuminant being disposed in the responsive range of the camera, where the control frequency (f_PWM) of the illuminant is less than the image-taking rate f1.

7 Claims, 3 Drawing Sheets

(56) References Cited

U.S. PATENT DOCUMENTS

| | | | |
|---|---|---|---|
| 8,334,901 B1 | 12/2012 | Ganick et al. | |
| 8,588,616 B2 * | 11/2013 | Langer | H04B 10/1141 139/191 |
| 8,942,570 B2 * | 1/2015 | Schenk | H05B 47/155 398/172 |
| 9,479,251 B2 * | 10/2016 | Muijs | H04B 10/116 |
| 2008/0122607 A1 | 5/2008 | Bradley | |
| 2011/0128384 A1 | 6/2011 | Tiscareno et al. | |
| 2012/0045219 A1 * | 2/2012 | Langer | H04B 10/116 398/182 |
| 2013/0038701 A1 * | 2/2013 | Hung | H04N 13/0221 348/49 |
| 2013/0183042 A1 | 7/2013 | Knapp et al. | |
| 2013/0195273 A1 | 8/2013 | Lord | |
| 2014/0072310 A1 * | 3/2014 | Yang | H05B 33/0845 398/118 |
| 2014/0093238 A1 * | 4/2014 | Roberts | H04B 10/116 398/43 |
| 2014/0186052 A1 * | 7/2014 | Oshima | H04N 5/23206 398/130 |
| 2014/0270792 A1 * | 9/2014 | Zhang | H04B 10/116 398/118 |
| 2014/0270799 A1 * | 9/2014 | Roberts | H04B 10/1141 398/130 |
| 2014/0286644 A1 * | 9/2014 | Oshima | H04B 10/11 398/118 |
| 2014/0301737 A1 * | 10/2014 | Guo | H05B 47/19 398/118 |

FOREIGN PATENT DOCUMENTS

| | | |
|---|---|---|
| WO | 2007/046600 A1 | 4/2007 |
| WO | 2013/108167 | 1/2013 |
| WO | 2013/108167 A1 | 7/2013 |

OTHER PUBLICATIONS

Lazaridis, Giorgos, PWM Modulation, Mar. 10, 2009, http://pcbheaven.com/wikipages/PWM_Modulation.*

International Preliminary Report on Patentability, dated Mar. 23, 2016, issued in corresponding International Application No. PCT/EP2014/002361.

International Search Report, dated Dec. 12, 2014, issued in corresponding International Application No. PCT/EP2014/002361.

U.S. Appl. No. 61/779,426, Roberts et al., filed Mar. 13, 2013.

* cited by examiner

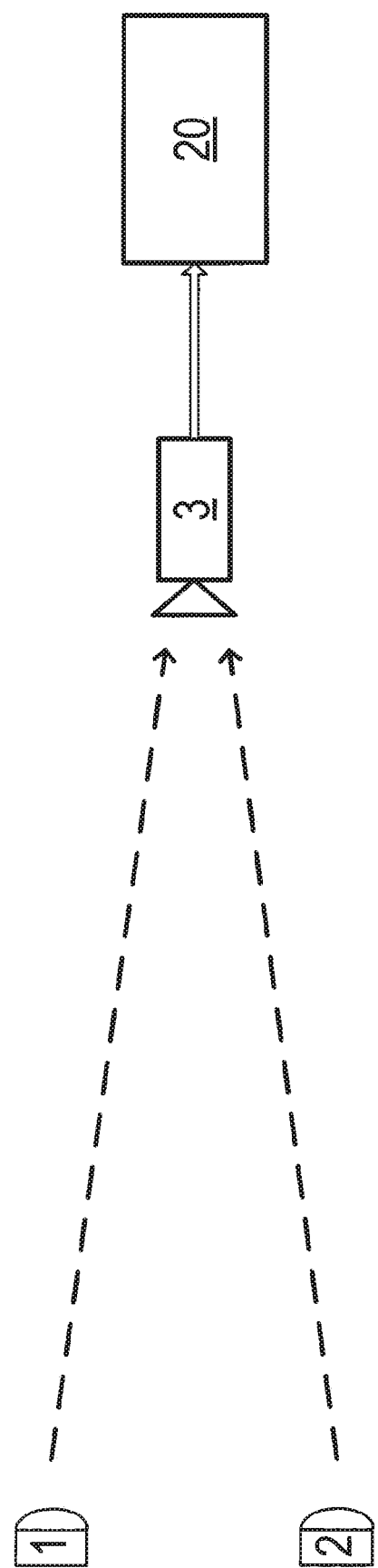

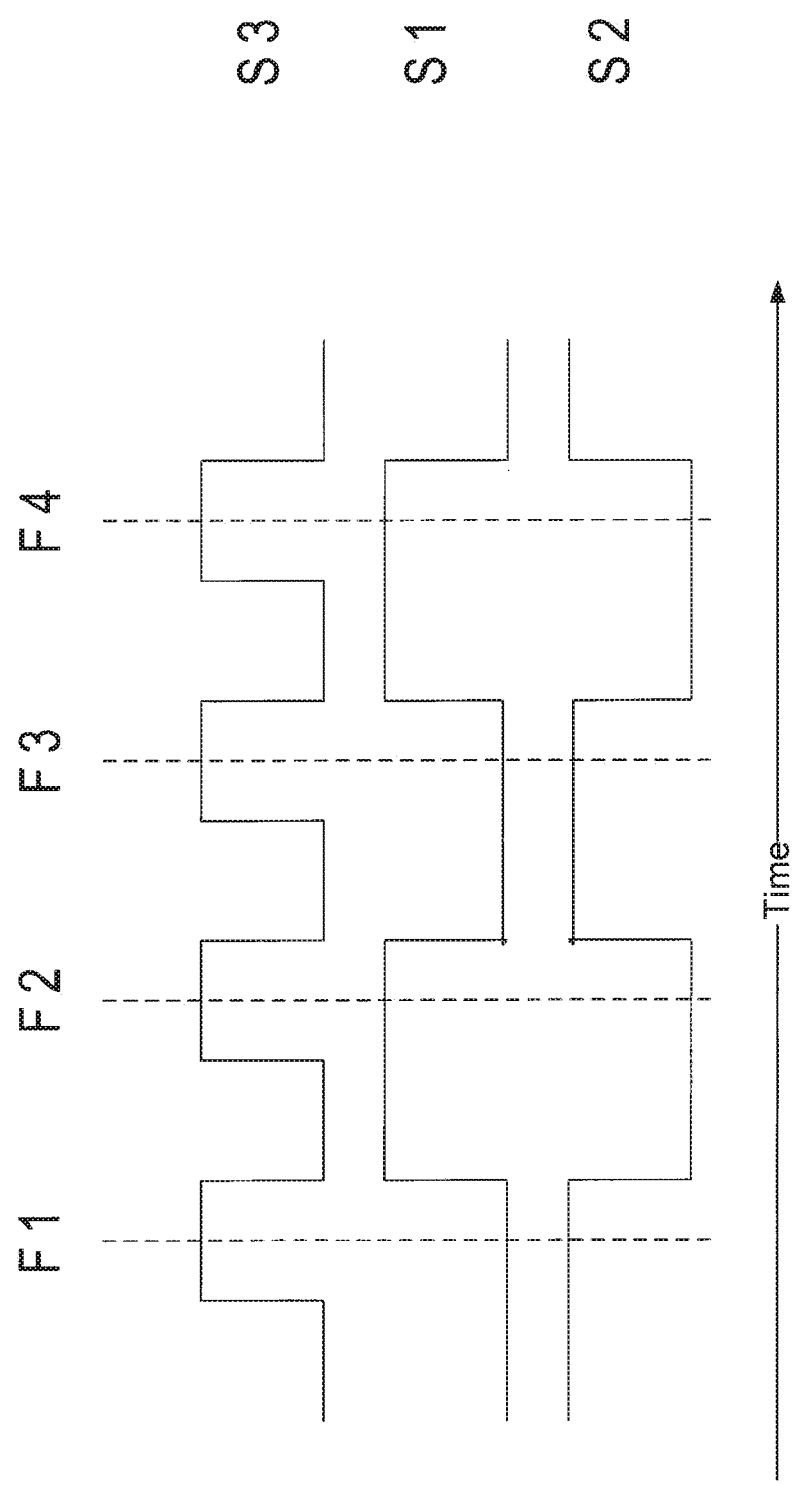

METHOD FOR TRANSMITTING INFORMATION AND DEVICE FOR CARRYING OUT THE METHOD

FIELD OF THE INVENTION

The present invention relates to a method for transmitting information and a device for carrying out the method.

BACKGROUND INFORMATION

It is generally known that a camera photographs images, especially spaced apart from each other at regular time intervals, particularly with a frame rate.

SUMMARY

Therefore, an object of the present invention is to contactlessly transmit information in an easy manner.

Features of the present invention with regard to the method for transmitting information are that images are photographed by a camera with an image-taking rate, thus, especially frame rate, a controllable illuminant being disposed within the responsive range of the camera, the control frequency (f_PWM) of the illuminant being less than the image-taking rate f1.

The advantage in this case is that the blinking of the illuminant is recognizable by comparing two images taken one after the other in time. In this context, a comparison of all picture elements is feasible, or a comparison of all row sums and column sums.

In one advantageous embodiment, control frequency f_PWM amounts to m times the image-taking rate f1, thus, in particular, f_PWM=m*f1, factor m amounting to between 0.4 and 0.6, particularly 0.5. The advantage in this case is that a high data-transmission rate is attainable, for by comparing two images taken directly following one another, an altered luminous state of an illuminant is easily recognizable.

In one advantageous development, the information to be transmitted is encoded as the pulse-width-modulation ratio of the control signal. This is advantageous because it permits easy encoding, and therefore easy data transmission.

In one advantageous refinement, a pulse-width-modulation ratio of more than 80%, thus especially 100%, signifies a logical 1, therefore one, and a ratio of less than 60%, especially 50%, signifies a logical 0, thus zero or vice versa. This offers the advantage that a simple and reliable data transmission is feasible.

In one advantageous embodiment, the picture elements of each image taken are displayable as a two-dimensional matrix, whose elements have numerical values for representing the gray level, color gradation or brightness of the corresponding picture element, the respective sum of the numerical values of a respective row of the matrix being formed, thus all row sums belonging to the image, and the respective sum of the numerical values of a respective column of the matrix being formed, thus all row sums belonging to the image, the differences between the row sums and the differences between the column sums of two images taken in a manner spaced over time being determined, and the picture element assigned to the illuminant being inferred from the non-vanishing differential values. The advantage in this case is that with only little storage volume and little computing capacity, nevertheless, large images, e.g., having more than 600×800 pixels, thus, picture elements, are evaluable very rapidly, and the changeable numerical values, therefore also the corresponding picture elements, are determinable.

In one advantageous development, the information is decoded from the change over time in the numerical values of the picture element assigned to the illuminant, in particular, by determining the pulse-width-modulation ratio, and from that, determining the information. This is advantageous because information is recognizable in an easy manner. For example, a logical 1 is recognizable when no change is discerned in the luminous state of the illuminant in the case of two images recorded one after another in time, and a logical 0 is recognizable when a change is discerned in the luminous state of the illuminant in the case of two images recorded one after another in time.

Features of the device for carrying out the method are that the camera has an evaluation unit for decoding the information, particularly for determining the luminosity characteristic of the illuminant over time.

This offers the advantage that a rapid evaluation and determination of the variable illuminant is feasible.

Further advantages are derived from the dependent claims. The present invention is not limited to the combination of features in the claims. Further useful combination possibilities of claims and/or individual claim features and/or features of the specification and/or of the figures are apparent to one skilled in the art, particularly from the problem definition and/or the objective set by comparison to the related art.

BRIEF DESCRIPTION OF THE DRAWINGS

FIG. 2 shows a part of the system pertaining to a transceiver, the signal characteristic detected with the aid of camera, especially light detector, 3 being supplied to an evaluation unit 20.

FIG. 3 shows control signals of illuminants (1, 2) and the sampled signal of the detector, thus, of the camera, especially light detector.

DETAILED DESCRIPTION

Figure 1:
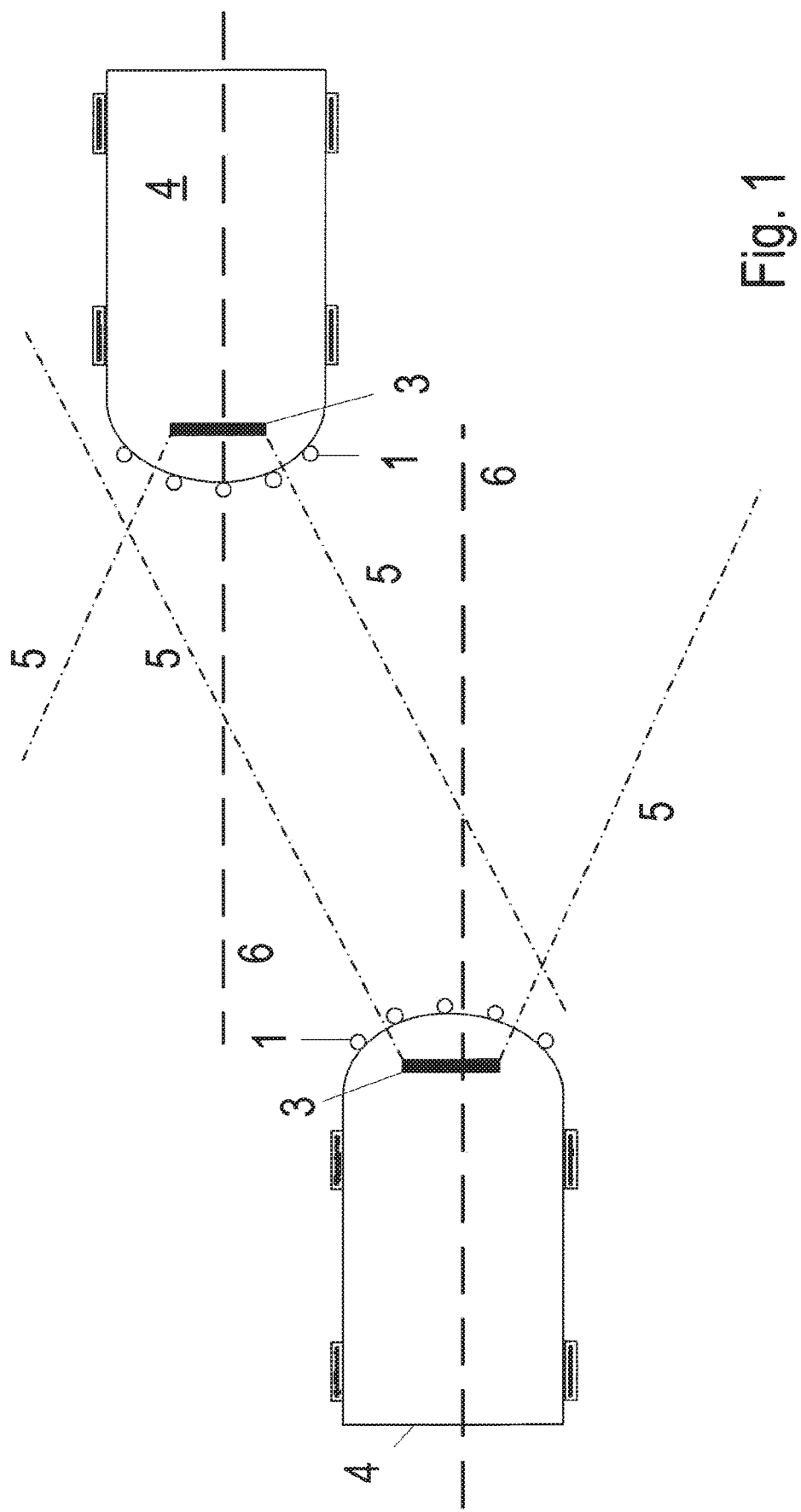
FIG. 1 shows a top view of a system according to the present invention.

As shown in FIGS. 1 through 3, the system has a camera 3, thus, particularly a light detector, which is able to be disposed on a first mobile part, especially vehicle 4.

A first illuminant 1 controllable by a control signal S1 and/or a second illuminant 2 controllable by a control signal S2 is/are disposed in stationary fashion or on another mobile part 4.

At least one of illuminants 1, 2 is located in responsive range 5 of camera 3. Illuminant 1, 2 is controlled in clocked fashion. In this instance, the period duration of the control signal or the duration of the pulse-width modulation is greater than or equal to the frame rate of the camera. Preferably, the pulse-width-modulation duration of control signal S1 amounts to double the period duration T1=1/f1 belonging to image frequency f1.

The information to be transmitted is modulated with the aid of the correspondingly encoded pulse-width-modulation ratio. In this context, for example, a ratio of more than 80%, thus especially 100%, signifies a logical 1, therefore one, and a ratio of less than 60%, especially 50%, signifies a logical 0, thus zero.

In FIG. 1, travel direction 6 of the two vehicles, thus mobile parts, 4 shown there is parallel and counter to each other.

The images taken by the camera are supplied to an evaluation unit 20, particularly an image-processing unit, especially FPGA. There, images recorded successively over time are evaluated in terms of changes. As shown in FIG. 3, in a first image, illuminant (1, 2) thus appears to be luminous, and in a following image as not luminous, because control S1 of illuminant 1 takes place half as fast as the frame rate. According to FIG. 3, the time duration of the control of the illuminant is realized with a pulse-width-modulation ratio of 50%. That means that the respective time durations for the activation of the illuminant and the deactivation of the illuminant are of equal length.

Control S2 of illuminant 2 is carried out in inverted fashion relative to control S1 of illuminant 1. The error rate is therefore minimized.

The frame rate is realized by a sampled signal S3 for camera 3, especially light detector, supplied to the camera.

In FIG. 3, the HIGH levels of the control signal control the taking of first frame F1, second frame F2, third frame F3 and fourth frame F4.

In a further exemplary embodiment according to the present invention, the blinking illuminant is recognized in such a way that each image, thus frame, taken is represented as an (m×n)-matrix, each element of the matrix, thus, picture element and/or pixel, being assigned a numerical value that represents the brightness, gray level, and/or color. After the image has been photographed, the respective row sum is formed, thus, each sum of the numerical values of a respective row, and the respective column sum is formed, thus, each sum of the column values of a respective row. After that, the difference is determined between the respective row sums of two images, especially two images directly following each other in time. From that, it is possible to localize the picture element belonging to the blinking, thus variable illuminant.

Taking further parameters into consideration, such as the predetermined spatial extension of the illuminant or spacing between two illuminants, it is then possible to determine not only the angle between the sightline of the camera and the direction under which the illuminant appears, but also the exact position.

LIST OF REFERENCE NUMERALS 1 first illuminant
2 second illuminant
3 camera, thus especially light detector
4 vehicle, thus especially mobile part
5 responsive range, especially reception range
6 travel direction
20 evaluation unit, particularly image-processing unit, especially FPGA
F1 first frame
F2 second frame
F3 third frame
F4 fourth frame
S1 signal, particularly control signal, of the first illuminant
S2 signal, particularly control signal, of the second. Illuminant
S3 sampled signal for camera, especially light detector

What is claimed is:

1. A method for transmitting information, comprising:
photographing an image by a camera with an image-taking rate corresponding to a frame rate, a controllable illuminant being disposed in a responsive range of the camera, wherein a control frequency of the illuminant is less than the image-taking Rate; wherein:
picture elements of each image taken are displayable as a two-dimensional matrix whose elements have numerical values for representing one of a gray level, color gradation, and a brightness of the corresponding picture element,
a respective sum of numerical values of a respective row of the matrix being formed, thus all row sums belonging to the image,
a respective sum of numerical values of a respective column of the matrix being formed, thus all row sums belonging to the image,
differences between the row sums and differences between the column sums of two images taken in a manner spaced over time are determined,
the picture element assigned to the illuminant is inferred from non-vanishing differential values, and
the information is decoded from a change over time in a numerical value of the picture element assigned to the illuminant, by determining a pulse-width-modulation ratio, and from that, determining the information.

2. The method as recited in claim 1, wherein:
the control frequency amounts to m times the image-taking rate according to the equation f_PWM=m*f1,
f_PWM corresponds to the control frequency,
f1 corresponds to the image-taking rate, and
the factor m is in a range between 0.4 and 0.6.

3. The method as recited in claim 2, wherein the factor m is 0.5.

4. The method as recited in claim 1, further comprising:
encoding the information to be transmitted as a pulse-width-modulation ratio of a control signal.

5. The method as recited in claim 4, wherein:
a pulse-width-modulation ratio of more than 80% signifies a logical 1, therefore one, and a ratio of less than 60% signifies a logical 0, thus zero or vice versa.

6. The method as recited in claim 5, wherein a ratio of less than 50% signifies a logical 0.

7. A device for transmitting information, comprising:
a camera that includes an evaluation unit for decoding the information by determining a luminous characteristic of an illuminant over time; wherein the device is adapted to perform the method recited in claim 1.

* * * * *